United States Patent [19]
Katagiri et al.

[11] 3,841,735
[45] Oct. 15, 1974

[54] ZOOM LENS SYSTEM OPERABLE FOR EXTREMELY SHORT DISTANCE PHOTOGRAPHY

[75] Inventors: Toru Katagiri, Nagano-ken; Akio Ito, Chino-shi; Toshiyuki Inoue, Suwa-shi, all of Japan

[73] Assignee: Sanko Kogaku Kogyo Kabushiki Kaisha, Nagano-ken, Japan

[22] Filed: July 17, 1972

[21] Appl. No.: 272,522

[52] U.S. Cl. .................................. 350/187, 350/255
[51] Int. Cl. ................................................ G02b 7/10
[58] Field of Search ..................... 350/184, 186, 187

[56] References Cited
UNITED STATES PATENTS

| | | | |
|---|---|---|---|
| 3,613,544 | 10/1971 | Plihal | 350/187 X |
| 3,655,271 | 4/1972 | Suzuki | 350/187 |
| 3,659,921 | 5/1972 | Hirose et al. | 350/186 |
| 3,661,445 | 5/1972 | Someya | 350/186 |
| 3,731,987 | 5/1973 | Iida et al. | 350/187 |

*Primary Examiner*—John K. Corbin
*Attorney, Agent, or Firm*—Ladas, Parry, Von Gehr, Goldsmith & Deschamps

[57] ABSTRACT

A zoom lens system having two movable lens groups disposed between a front focusing lens used only for focusing and a relay lens, wherein normal zoom photography and extremely short distance photography are carried out by shifting said two movable lens groups in the direction of the optical axis, said zoom lens system comprising a cam cylinder having cam grooves formed thereon for shifting said two movable lens groups along the optical axis, a zoom ring for operating said two movable lens groups through said cam cylinder, said cam cylinder and said zoom ring being integrally connected and coaxial with each other, and locking means for preventing said two movable lens groups from entering the extremely short distance photography zone during the normal zoom photography against the intention of the operator taking a photograph.

1 Claim, 9 Drawing Figures

ZOOM LENS SYSTEM OPERABLE FOR EXTREMELY SHORT DISTANCE PHOTOGRAPHY

This invention relates to a zoom lens system, which is operable for extremely short distance photography.

In the conventional zoom lens system of general type, extremely short distance photography is carried out by use of an additional lens attached to the front of the taking lens. In such a case, the focussing distance is fixed and accordingly it is not possible to take a desired size of object at a desired distance in the visual field of the lens. Further, in case of the extremely short distance photography, the quality of the image taken is liable to be deteriorated.

Figure 1A:
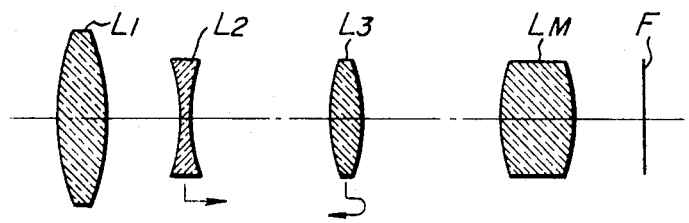
Figure 1B:
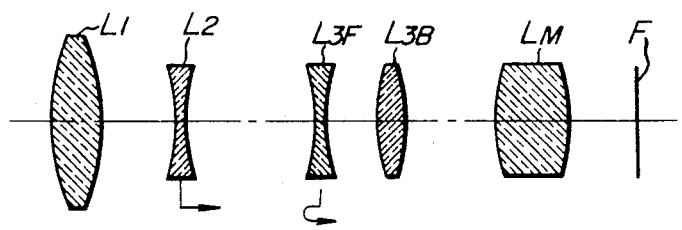
Figure 1C:
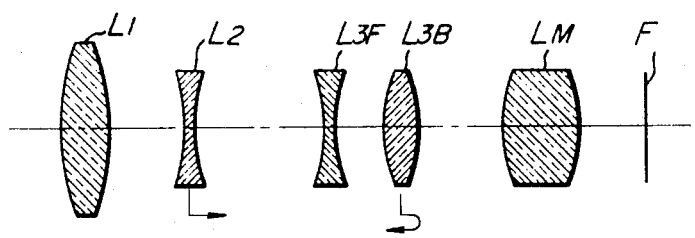
Figure 2:
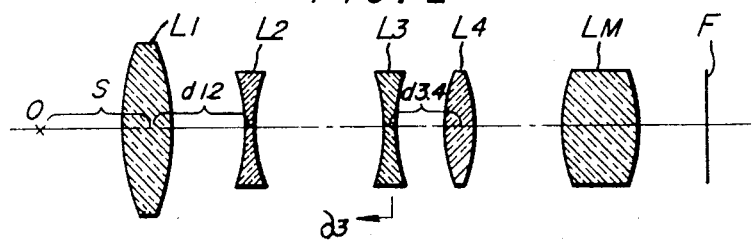

This invention aims to eliminate the above defects of the conventional zoom lens system. For better understanding of this invention with reference to the object thereof, however, the defects or disadvantages of the conventional general zoom lens system will now be described in detail referring to FIGS. 1a, 1b and 1c of the drawings in which;

FIGS. 1a, 1b and 1c are side views showing the construction of the well known conventional zoom lens systems of different types respectively, and FIG. 2 is a side view of the zoom lens system shown in FIG. 1b for explaining the amount of movement of the rear movable lens for focussing with different reference characters on some lens elements.

Now referring to FIG. 1a in which a basic construction of the zoom lens system employed in general compact cameras is shown, the zoom lens system comprises a front focussing lens $L_1$, a first movable lens $L_2$ within an afocal lens system, a second movable lens $L_3$ in the afocal lens system, and a relay lens $L_M$ wherein the front focussing lens $L_1$ is moved along the optical axis only for focussing and accordingly is stopped when taking a photograph. The relay lens $L_M$ is always stopped on the optical axis serving as a focussing lens to receive parallel light rays coming from the last movable lens $L_3$ in the afocal lens system and converge the rays and focus an image of the object on a photosensitive film F. The lens system shown in FIG. 1a is in its relative position at the time of maximum wide angle photography, and the first movable lens $L_2$ moves rightward along the optical axis as the system is changed to the telescopic photographic relative position. At the same time when the first movable lens $L_2$ moves rightward, the second movable lens $L_3$ moves rightward at the first half stage of its movement and then returns leftward on the way of its motion. Consequently, as is well known, the said two movable lenses $L_2$ and $L_3$ approach to each other to the most extent at the end of the telescopic photographic stage.

Thereafter, the basic construction of the lens system shown in FIG. 1a was improved, and the second movable lens $L_3$ has been divided into a negative lens $L_{3F}$ and a positive lens $L_{3B}$ to correct aberration as shown in FIGS. 1b and 1c. The function of the front focussing lens $L_1$, the first movable lens $L_2$ and the relay lens $L_M$ in the two kinds of improved zoom lens systems is similar to that of the lens system shown in FIG. 1a. However, in the lens system shown in FIG. 1B, the movement of the positive lens $L_{3B}$ is stopped during the zooming operation thereof, and while the first movable lens $L_2$ moves rightward along the optical axis to change its position from wide angle to telescopic position similarly to the movement of the lens $L_2$ in FIG. 1a, the negative lens $L_{3F}$ moves leftward in the first half stage of the movement thereof and thereafter returns rightward. In the lens system shown in FIG. 1c, the movement of the negative lens $L_{3F}$ is stopped during the zooming operation thereof, and while the first movable lens $L_2$ moves rightward to change its position from wide angle to telescopic position, the positive lens $L_{3B}$ moves rightward in the first half stage and then returns to the left similarly to the lens $L_3$ shown in FIG. 1a. The improved construction and the function of the lens systems shown in FIGS. 1b and 1c as described hereinabove are also well known in the art.

In the conventional type of zoom lens systems as shown in FIGS. 1a to 1c, the diameter of the front focussing lens $L_1$ should be made large in order to evade the vignetting thereof, since the front lens $L_1$ is moved from the backed position focussed on the infinite distance to the advanced position focussed on an object in the short distance. This is one of the defects of the conventional type zoom lens systems. Further, if it is made possible to perform a too short distance photography, the amount of movement of the front focussing lens is made too long. Accordingly, the length of the lens barrel becomes long and the camera can not be made compact easily as well as the visual field at the time of normal photography is narrowed. On the basis of such inevitable optical reasons, the limit of the short distance photography in the normal small-sized motion picture camera with a zoom lens is made as long as 1 m or so in the design of the lens barrel, and an attachment lens for contact photography is fixed to the front face of the front focussing lens for a short distance photography beyond said limit. In case where the attachment lens is used, however, the short distance photography is allowed only at a predetermined distance fixed to the attachment lens according to its focal length. In such a case, accordingly, it is impossible to take a photograph of a small object with any desired size of the image thereof occupying the entire visual field of the lens system. In addition, there is a fear of deteriorating the quality of the image when a picture is taken at an exceedingly near distance.

Now considering the lens system as shown in FIGS. 1a to 1c, on the other hand, it is proved that the focussing operation itself, apart from the zooming operation, can be performed by varying the relative position of other lenses without depending on the operation of the front focussing lens $L_1$.

The present invention utilizes the above mentioned change of the relative position among the movable lenses other than the front lens in the zoom lens system to enable the photographing of an object in the short distance. That is to say, in the present invention, a front movable lens in an afocal optical system in a zoom lens system is stopped at the wide angle photography limit position and a rear movable lens is suitably moved along the optical axis to enable the focussing on an object existing at any distance from the motion picture camera, that is an object being located within the range from the infinite distance to a position in contact with the surface of the front focussing lens.

It is accordingly an object of the present invention to provide a zoom lens system which makes it possible to focus an image of an object at an extremely short distance from the camera.

It is another object of the present invention to provide a zoom lens system of small size which is able to take a picture of an object at an extremely short distance.

It is still another object of the present invention to provide a zoom lens system which is able to photograph an object at an extremely short distance without deterioration in the quality of the image obtained.

It is a further object of the present invention to provide a zoom lens system which is able to focus an image of an object at any distance from the system.

It is a still further object of the present invention to provide a zoom lens system with which a contact photograph is taken without using an attachment lens.

Figure 3:
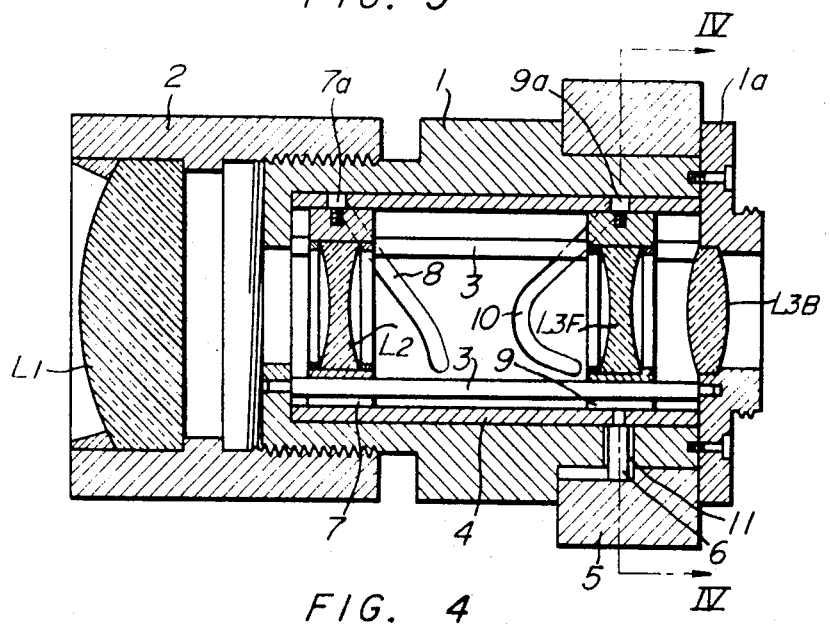
Figure 4:
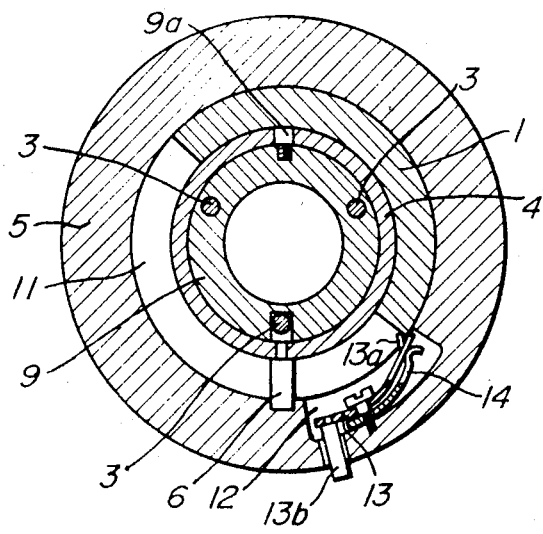
Figure 5:
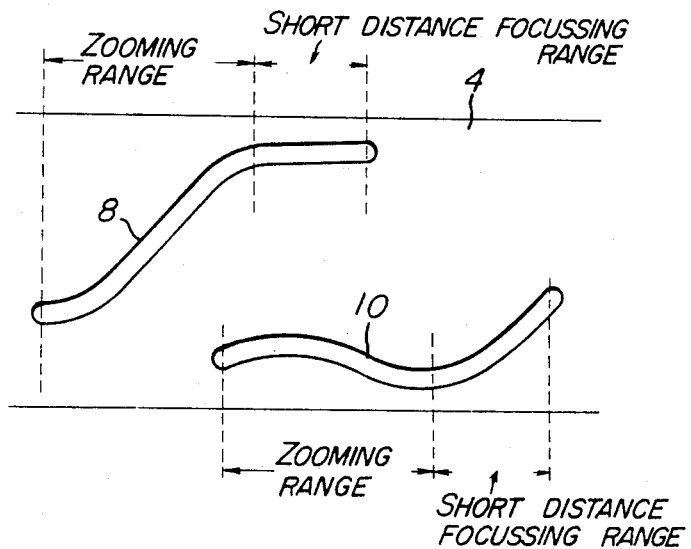
Figure 6:
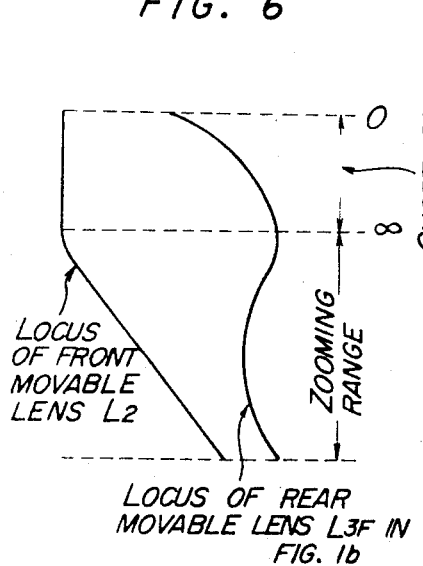
Figure 7:
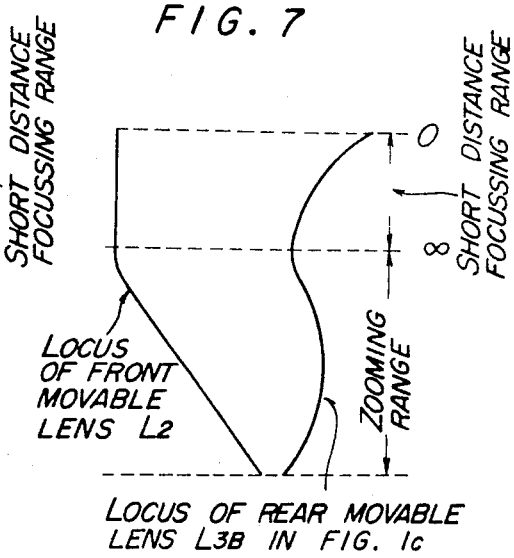

Other objects, features and advantages of the present invention will be made apparent from the following detailed description of a preferred embodiment thereof taken in conjunction with the accompanying drawings in which:

FIG. 3 is a longitudinal sectional view showing an embodiment of the present invention wherein the zoom lens system of FIG. 1b is incorporated into a lens barrel of a small-sized motion picture camera, FIG. 4 is a cross sectional view taken along the line IV—IV of FIG. 3, FIG. 5 is a developed view showing the cam cylinder wall in an embodiment of the zoom lens system in accordance with the present invention, FIG. 6 is a graphical representation showing the locus of the movable lenses in an embodiment of the zoom lens system of the invention, and FIG. 7 is a graphical representation showing the locus of the movable lenses in another embodiment of the zoom lens system in accordance with the present invention.

Now referring to FIGS. 3 and 4 showing an embodiment of the present invention wherein the zoom lens system of FIG. 1b is incorporated into a lens barrel of a small-sized motion picture camera, the construction and function will be described hereinbelow. In a small motion picture camera, a relay lens $L_M$ is generally fixed to the camera body and accordingly no relay lens is incorporated in the lens barrel shown in FIG. 3. A focussing ring 2 holding a front focussing lens $L_1$ for focussing is concentrically screwed to the outer periphery of the front end portion of a main cylinder 1 of the lens barrel, and is movable in the direction of the optical axis of the lenses. Between the inner periphery of the front end portion of the main cylinder 1 and a plate 1a which is integrally fixed to the rear end of the main cylinder 1 and holds a rear fixed lens $L_{3R}$, three guide bars 3 are provided in parallel to the optical axis of the lenses. The plate 1a is mounted to the camera body in screw engagement therewith. A cam cylinder 4 is rotatably and concentrically mounted to the inner wall surface of the main cylinder 1. The cam cylinder 4 is connected with a zoom ring 5 concentrically and rotatably mounted to the outer periphery of the main cylinder 1 so as to rotate therewith, by means of a pin 6. A dowel 7a projects from the outer periphery of a holding frame 7 for the front movable lens $L_2$ which is movable along the three guide bars 3 in the direction of the optical axis. The dowel 7a is in slidable engagement with a front cam groove 8 formed in the cam cylinder 4. Similarly, a dowel 9a fixed to a holding frame 9 for the rear movable lens $L_{3F}$ which is movable along the three guide bars 3 in the direction of the optical axis is slidably engaged with a rear cam groove 10 formed in the cam cylinder 4. Accordingly, if the zoom ring 5 is rotated counterclockwise when viewed from the right in FIG. 3, the rear movable lens $L_{3F}$ moves forward along the cam groove 10 at the first stage and then returns backward while the front movable lens $L_2$ moves backward along the cam groove 8. The operation of the zoom lens system described so far is well known in the art as mentioned hereinbefore referring to FIG. 1b.

In the zoom lens in accordance with the present invention, the upper end of the front cam groove 8 shown in FIG. 3 is further extended in this side in a plane perpendicular to the optical axis of the lenses and the upper end of the rear cam groove 10 is extended in this side such that it is progressively inclined forwardly on the surface of the cam cylinder assuming that FIG. 3 shows the position of each lens in the maximum wide angle photographic position. Therefore, if the zoom ring 5 is rotated clockwise when viewed from the right in FIG. 3, the rear movable lens $L_{3F}$ moves forward along the cam groove 10 in its extended portion as mentioned above in the direction of the optical axis, while on the other hand the front movable lens $L_2$ does not move in the direction of the optical axis.

The locus of the front and rear movable lenses as described referring to FIG. 3 in the direction of the optical axis can be represented as shown in the linear representation of FIG. 6. In the practical manufacture of the zoom lens, however, both the cam grooves 8 and 10 are usually designed so as not to be located so close to each other by spacing one groove relative to the other groove in the direction of rotation of the cam cylinder, since the strength of the cam cylinder 4 is lowered if the two grooves are located so close to each other. FIG. 5 is a developed view showing the relative position of the cam grooves 8 and 10 which are designed according to the intention as mentioned hereinabove.

FIGS. 5 and 6 show the construction of the cam cylinder 4 and the locus of the movable lenses which are required for carrying out an extremely short distance photography in the zoom lens system shown in FIG. 1b. If the zoom lens system shown in FIG. 1c is used to carry out the short distance photography, the locus of the movement of the front and rear movable lenses $L_2$ and $L_{3R}$ should be as shown in FIG. 7. In the case that the locus as shown in FIG. 7 is employed, the rear movable lens $L_{3R}$ moves backward as the taking distance becomes shorter contrary to the case as shown in FIG. 6 while the front movable lens $L_2$ is stopped at a limit position of the wide angle photography.

Now since the focussing of the extremely short distance object is carried out in one part of rotation of the zoom ring 5 and the zooming is carried out in the other part of rotation thereof, it should be prevented that the zoom ring rotates beyond the wide angle limit position to the range of focussing for the extremely short distance during the zooming operation thereof. For this purpose, in the embodiment shown in FIGS. 3 and 4, the wall of the main cylinder 1 is cut off at the reference numeral 11 in the plane of rotation of said pin 6 by an angle in which the zoom ring 5 should be rotated for varying magnifying power so that the zoom ring 5 may not rotate beyond the limit. Further, the inner wall of the zoom ring 5 faced to the cut off portion 11 is formed with a recess 12 (FIG. 4) at a proper position thereof. In the recess 12, is mounted a lever 13 having a raised portion 13a which is formed by raising a part of one end of the lever 13 and is normally urged to project into the cut off portion 11 of the main cylinder 1 by means of a spring 14. A pin 13b is mounted on the lever 13 at the other end thereof which pin extends beyond the outer periphery of the zoom ring 5 loosely passing through the opening therein. By pushing inward the pin 13b against the resilient force of the spring 14, the raised portion 13a is retracted into the recess 12. In the state wherein the raised portion 13a of the lever 13 is in contact with one end of the cut off portion 11 as shown in FIG. 4, the zoom ring 5 cannot be rotated further beyond the wide angle limit wherein the front and rear movable lenses $L_2$ and $L_{3F}$ are set in the wide angle limit positions. In this state, the zoom ring can not be rotated in counterclockwise direction as viewed in FIG. 4, but the zoom ring 5 can be rotated clockwise until the pin 6 abuts on the opposite side of the cut off portion 11 thereby getting to the limit of the telescopic position. When the lens system is desired to be focussed on an extremely short distance object, the pin 13b is pushed down to make the raised portion 13a be retracted into the recess 12 and the zoom ring 5 is rotated counterclockwise. Further, when the zoom ring 5 is rotated clockwise in FIG. 4 in the state focussed on the extremely short distance object, the system is once out of focus but then the raised portion 13a springs out into the cut off portion 11 by means of the resilient force of the spring 14 at the time when the system comes to a state as shown in FIG. 4, and at the same time, the lens system is focussed on the infinite distance and set at the wide angle limit. Therefore, by rotating the zoom ring 5 further in the same direction, any magnifying power of the lens can be obtained.

A considerably interesting result can be obtained by applying the above operation to the photographing of the title in a motion picture. For instance, a transparent plate of about 35mm film frame size (Leica size) on which a letters of the title are drawn is held in a slide mount and located immediately in front of the zoom lens of the invention. By focussing the zoom lens to the plate, a sharp title letters can be photographed with a desirable scene being out of focus for a background. Then, by rotating the zoom ring to vary the power as mentioned hereinbefore with the slide of the title located in front of the lens as it was, it is possible to focus the zoom lens to the indefinite distance or the background scene with the title being extremely out of focus to such an extent that the letters of the title cannot be seen. Thus, a high technique which is commonly used in commercial films and the like can be enjoyed even by amateur photographers by use of a compact motion picture camera with a zoom lens in accordance with the present invention without the aid of a printer which has normally been used for such purposes.

The primary feature of the present invention is, as mentioned at the beginning of this specification, that the lens system is able to be focussed to an object being located within the range from the indefinite to a position in contact with the front face of the front lens by moving a rear movable lens in the direction of optical axis while a front movable lens is stopped at a wide angle limit. In designing of the zoom lens system of the invention, therefore, it is only required to extend the cam grooves on the cam cylinder for controlling the movement of the movable lenses from its end corresponding to the wide angle limit. It is easy to make such cam grooves on a single cam cylinder.

Now the reason it is more advantageous to fix the front movable lens in the afocal lens system at its wide angle limit than to fix the same lens at its telescopic limit in order to photograph a small object in an enlarged size at an extremely short distance will be explained hereinbelow. In the general zoom lenses, the principal plane of the lens on the object side is in front of the lens in case of wide angle photography and is far behind of the lens in case of telescopic photography. The principal plane on the image side is only moved forward according to the rate of power variation of the zoom lens as the lens system changes from the wide angle to telescopic situation, and the amount of movement of the principal plane on the image side is much smaller than that of the principal plane on the object side. Since the magnification of the image is represented by a ratio of the distance from the principal plane on the object side to the object to the distance from the principal plane on the image side to the image, the magnification is lowered in case of the extremely short distance photography wherein the object is very close to the lens and the principal plane on the object side in case of telescopic position moves backward. In this invention, this disadvantage is eliminated by fixing the front movable lens at its wide angle limit, which is one of the greatest advantages or features of the present invention together with said advantages in construction.

Furthermore, in the general contact photography, it is impossible in practical sense to take a contact photograph of an object located several millimeters in front of the front focussing lens, since photographing at an extremely short distance deteriorates the quality of image. In cases where an attachment lens for contact photographing is used with the zoom lens, the aberration of the lens is generally increased considerably by adding the attachment lens to the zoom lens the aberration of which has been sufficiently corrected. In the present invention, however, the quality of image is maintained in good condition even in the case of contact photographing since the relative position of the lenses in the lens system is not changed remarkably but an air space at a part of the lens system is slightly varied.

Lastly, a general formula for calculating the amount of movement of the rear movable lens in taking the extremely short distance photograph in the zoom lens system in accordance with the present invention will be shown with respect to the distance from the object to the lens. In the following description of the formula therefor, the reference characters used in FIGS. 1b and 1C are changed to more convenient ones for representation of the formula as shown in FIG. 2.

In the zoom lens system as shown in FIG. 2, the amount of displacement of the image plane $\delta$ between the position where an image of an object at the infinite distance is focussed through lenses $L_1$ and $L_2$ and the position where an image of an object 0 at an extremely short distance is focussed through the lenses $L_1$ and $L_2$ should satisfy the following formula because the light rays directed to the relay lens $L_M$ from the last lens $L_4$ in the afocal lens system should be in parallel to each other so long as the lens system is a zoom lens system:

$$\delta = \frac{\frac{f_1^2 \cdot f_2^2}{S-f_1}}{A\left(A+\frac{f_2^2}{S-f_1}\right)} \quad (1)$$

where $$A = f_1 + f_2 - d_{1,2}$$

wherein $S$ is a distance from the object $0$ at the extremely short distance to the front focussing lens $L_1$; $f_1$, $f_2$ and $f_3$ are focal lengths of the lenses $L_1$, $L_2$ and $L_3$, respectively; and $d_{1,2}$ is a distance between the lenses $L_1$ and $L_2$ at the time of maximum wide angle photography in the general photographic condition.

Therefore, the amount of movement $\delta_3$ of the lens $L_3$ required for compensating the distance $\delta$ between the focussing planes by the lens $L_3$ should satisfy the following formula:

$$\delta_3 = 1/2 \, (\delta - f_3^2 - B^2/B) + \sqrt{\left\{\frac{1}{2}\left(\delta - \frac{f_3^2 - B^2}{B}\right)\right\}^2 - B\delta} \quad (2)$$

where $B = -(f_3 + f_4 - d_{3,4})$, and $d_{3,4}$ is a distance between the lenses $L_3$ and $L_4$ at the time of maximum wide angle photography in the general photographic condition.

The above formula means that the zoom lens system can be focussed to an object $0$ at any short distance by moving the lens $L_3$ by a distance $\delta_3$. Further, it will be understood that if the construction of the zoom lens is so simple that it consists of only lenses $L_1$, $L_2$, $L_3$ and $L_M$ as shown in FIG. 1a, the lens system can be focussed to an object at any extremely short distance $S$ by moving the rear movable lens $L_3$ by a distance $\delta$.

As will be apparent from the foregoing formulae (1) and (2), the amount of movement of the rear movable lens $L_3$ required for focussing the zoom lens system to an object at an extremely short distance may be considerably small. Therefore, it is not difficult to design the zoom lens system with other lens in the same lens barrel, and the range for focussing the zoom lens system on the object at the extremely short distance on the wall surface of the cam cylinder (See FIGS. 5, 6 and 7) can be designed sufficiently long. Accordingly, the angle of rotation of the zoom ring for focussing the zoom lens on the object at the extremely short distance can also be made large. Thus, the focussing operation of the extremely short distance object is considerably facilitated.

What is claimed is:

1. A zoom lens system comprising a front and rear movable lens group disposed between a front focusing lens used only for focusing and a relay lens, said zoom lens system comprising a cam cylinder having two cam grooves formed thereon for shifting the rear movable lens group along the optical axis while holding the front movable lens group stationary at the limit position for wide angle photographing, a fixed main cylinder provided around said cam cylinder coaxially therewith and having formed therein a cutout for controlling the range of rotation of a zoom ring said zoom ring being provided around said main cylinder coaxially therewith and slidable relative thereto, said zoom ring and said cam cylinder being integrally connected by a pin provided through said cutout of the main cylinder, said zoom ring being formed with a recess at a suitable location of the inner wall thereof opposite to the cutout of said main cylinder, and a locking member provided in said recess and having a locking portion selectively rotatable between a position to project into said cutout and a position not to project into said cutout.

* * * * *

UNITED STATES PATENT OFFICE
CERTIFICATE OF CORRECTION

Patent No. 3,841,735                              Dated October 15, 1974

Inventor(s) Toru KATAGIRI, Akio ITO and Toshiyuki INOUE

It is certified that error appears in the above-identified patent and that said Letters Patent are hereby corrected as shown below:

Please correct the spelling of the name of the assignee as follows:

In column one, line 7 on the cover sheet of the patent, change the spelling of the assignee from SANKO KOGAKU KOGYO KABUSHIKI-KAISHA to SANKYO KOGAKU KOGYO KABUSHIKI-KAISHA.

Signed and sealed this 11th day of February 1975.

(SEAL)
Attest:

RUTH C. MASON
Attesting Officer

C. MARSHALL DANN
Commissioner of Patents
and Trademarks